United States Patent
Chong et al.

(10) Patent No.: US 7,638,756 B2
(45) Date of Patent: Dec. 29, 2009

(54) PHOTODETECTOR ARRAY AND CODEWHEEL CONFIGURATION FOR FLEXIBLE OPTICAL ENCODER RESOLUTION

(75) Inventors: Chee Keong Chong, Pulau Pingang (MY); Kay Keat Khoo, Perak (MY); Chi Mun Ho, N. Sembilan (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/140,645

(22) Filed: Jun. 17, 2008

(65) Prior Publication Data
US 2008/0245956 A1    Oct. 9, 2008

Related U.S. Application Data

(62) Division of application No. 10/909,482, filed on Aug. 2, 2004, now Pat. No. 7,449,675.

(51) Int. Cl.
*G01D 5/34* (2006.01)
(52) U.S. Cl. .............. 250/231.13; 250/231.14; 250/231.16

(58) Field of Classification Search ............... 250/231.13–231.18, 237 G
See application file for complete search history.

(56) References Cited

U.S. PATENT DOCUMENTS

| 4,451,731 | A |   | 5/1984 | Leonard |
|---|---|---|---|---|
| 4,529,964 | A | * | 7/1985 | Minami et al. ........... 341/13 |
| 4,691,101 | A |   | 9/1987 | Leonard |
| 4,712,000 | A | * | 12/1987 | Yoshikawa et al. ...... 250/205 |
| 5,241,172 | A |   | 8/1993 | Lugaresi |
| 6,590,201 | B2 | * | 7/2003 | Ueda ................. 250/231.13 |
| 2004/0262498 | A1 | * | 12/2004 | Shichi et al. ........... 250/214 R |

* cited by examiner

*Primary Examiner*—Georgia Y Epps
*Assistant Examiner*—Tony Ko

(57) ABSTRACT

An optical encoder includes a coding element having a track with multiple transparent sections, a light source positioned to output light to the track, and a photodetector array, positioned to detect light that passes through the transparent sections of the track. The photodetectors of the photodetector array have larger width dimensions than the width dimensions of the transparent sections of the track. Resolution of the optical encoder may be adjusted by changing the resolution of the coding element.

8 Claims, 8 Drawing Sheets

PHOTODETECTOR ARRAY AND CODEWHEEL CONFIGURATION FOR FLEXIBLE OPTICAL ENCODER RESOLUTION

CROSS REFERENCE TO RELATED APPLICATIONS

This is a Divisional of co-pending application Ser. No. 10/909,482, filed on Aug. 2, 2004, the entire disclosure of which is incorporated herein by reference.

BACKGROUND OF THE INVENTION

Optical encoders are used to monitor the motion of, for example, a shaft such as a crankshaft. Optical encoders can monitor the motion of a shaft in terms of position and/or number of revolutions of the shaft. Optical encoders typically use a codewheel attached to the shaft to modulate light as the shaft and the codewheel rotate. The light is modulated as it passes through a track on the codewheel that includes a pattern of transparent and opaque sections. As the light is modulated in response to the rotation of the codewheel, a stream of electrical signals is generated from a photodetector array that receives the modulated light. The electrical signals are used to determine the position and/or number of revolutions of the shaft.

When using an optical encoder, the current of the electrical signals fluctuates between a "dark current" and a "light current". The dark current corresponds to when an opaque section of the track on the codewheel is positioned between the light source and a photodetector of the photodetector array. The light current corresponds to the dark current plus current generated by a photodetector of the photodetector array when a transparent section of the track on the codewheel is positioned between the light source and a photodetector of the photodetector array. In this way, the modulated light causes the electrical signal to swing continuously from dark current to light current and back.

It may be desirable to change the frequency of the electrical signal in order to achieve a higher resolution. An interpolation integrated circuit (IC) may be used to change the frequency of the electrical signal. However, using an interpolation IC in this way may require a new PCB layout (due to the additional interpolation IC component) and package redesign. Typically, this increases the cost and size of the product. Moreover, an additional IC typically increases current consumption, which directly impacts heat dissipation and performance.

SUMMARY OF THE INVENTION

An optical encoder includes a coding element having a track with multiple transparent sections, a light source positioned to output light to the track, and a photodetector array, positioned to detect light that passes through the transparent sections of the track. The photodetectors of the photodetector array are configured to have larger width dimensions than the width dimensions of the transparent sections of the track, which results in a greater number of transparent sections than photodetectors per unit of length. The larger width dimension of the photodetectors causes an increase in the frequency of the resulting electrical signals from the photodetector array, which translates into improved resolution for the codewheel.

In an embodiment, the coding element of the optical encoder has a resolution that is mismatched with the resolution of the photodetector array. By increasing the resolution of the coding element, the resolution of the optical encoder increases. To change the resolution of the coding element, the coding element can be swapped with another coding element having a different resolution. Using this technique, the resolution of the optical encoder can be changed without changing the resolution of the photodetector array, without package redesign, and without adding additional chips (such as an Interpolator IC) or increasing current consumption.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description similar reference numbers may be used to identify similar elements.

DETAILED DESCRIPTION OF THE INVENTION

Figure 1:
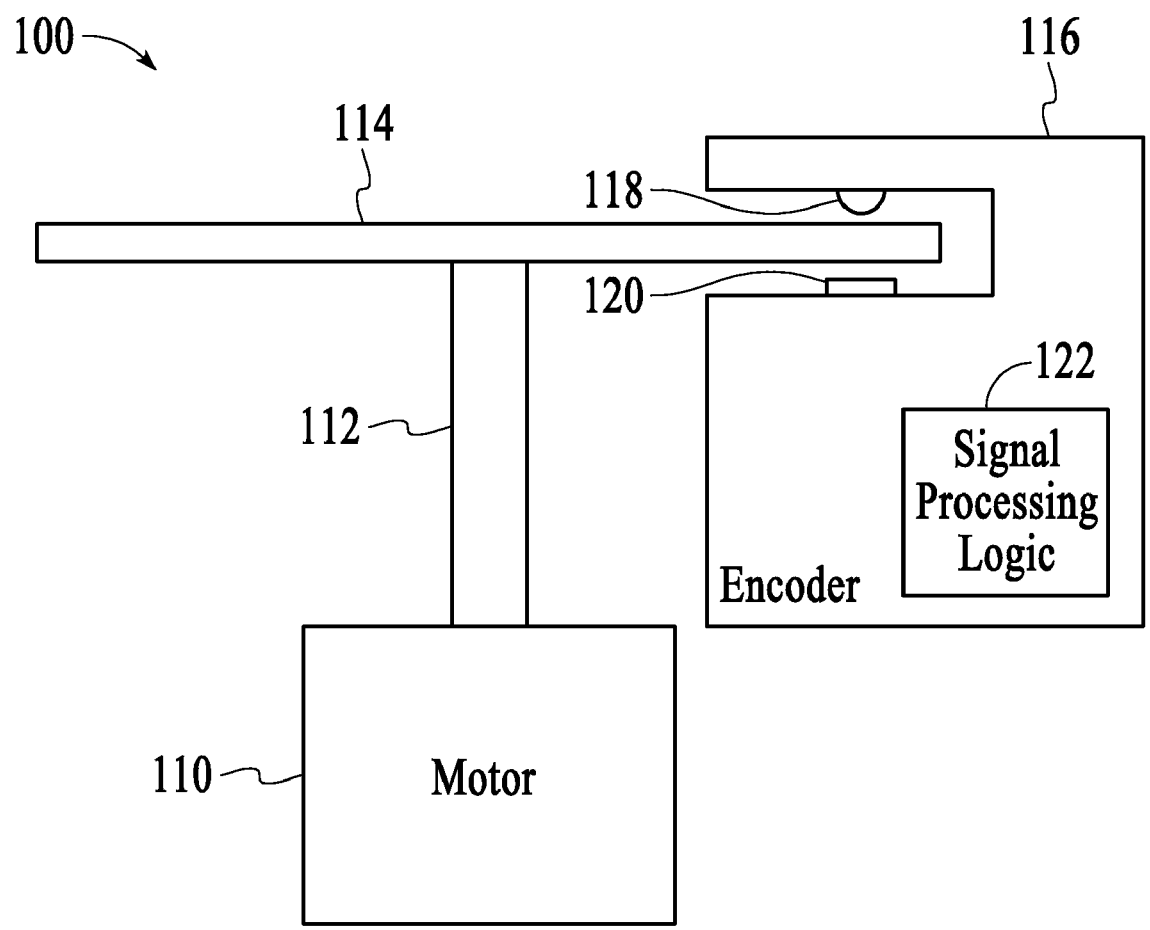
FIG. 1 depicts an optical encoder system for measuring the rotational movement of a shaft.

FIG. 1 depicts an optical encoder system 100 for measuring the rotational movement of a shaft. The optical encoder system includes a motor 110, a shaft 112, a codewheel 114, and an encoder 116. The codewheel includes at least one track (not shown) and the encoder includes a light source 118 of at least one LED and a photodetector array 120 that are aligned with the track. The encoder also includes signal processing logic 122 that processes electrical signals that are output from the photodetector array to measure the rotational movement of the shaft. The motor, shaft, codewheel, and encoder are well-known in the field of optical position encoders. In particular, see U.S. Pat. Nos. 4,451,731, 4,691,101, and 5,241,172, which are incorporated by reference herein.

Figure 2:
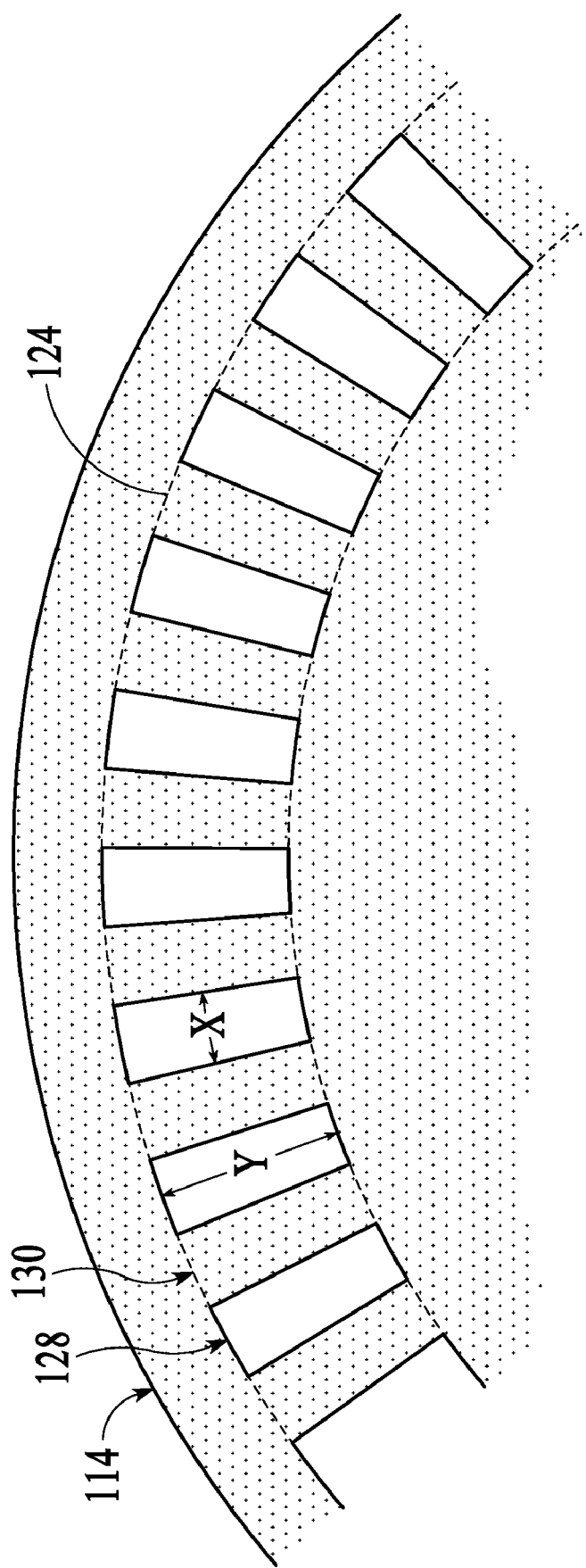
FIG. 2 depicts a portion of a codewheel.

FIG. 2 depicts a portion of a codewheel 114 that includes a track 124. The track may be a circular track that is concentric with the codewheel. The track includes a continuous repeating pattern of transparent sections 128 and opaque sections 130 that go all the way around the codewheel. The track modulates light to measure positional changes of the codewheel and the shaft 112. In the embodiment of FIG. 2, the transparent and opaque sections of the track have the same circumferential dimensions (also referred to as the width dimension). The width dimensions of the transparent and opaque sections (as indicated by the span "x") are a function of the desired resolution of the codewheel. The radial dimensions (referred to herein as the height dimensions) of the transparent and opaque sections (as indicated by the span "y") are a function of the amount of area required to generate a sufficient amount of photocurrent (e.g., the more photocurrent that is required, the larger the area required and hence the larger "y" needs to be since area equals "x" times "y"). Throughout the description, the height of the track is equivalent to the height of the transparent sections of the track. The track may utilize other patterns of transparent and opaque sections to modulate light as is known in the field.

Figure 3:
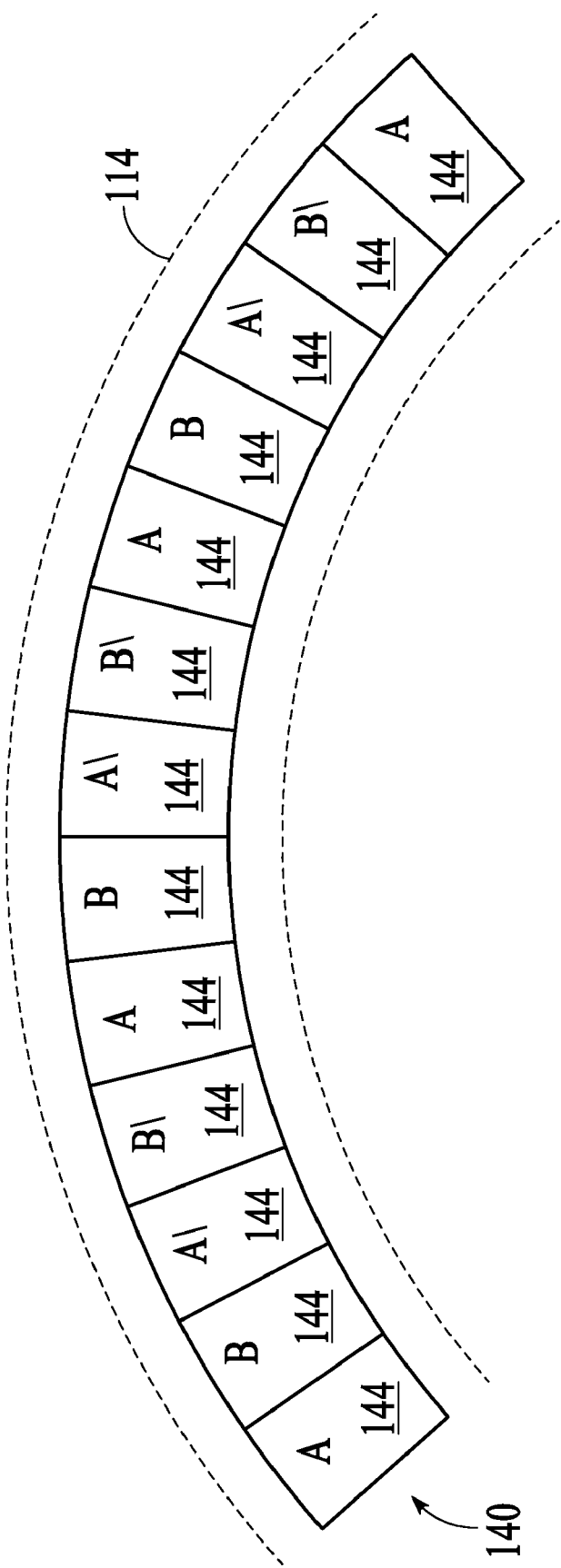
FIG. 3 depicts an embodiment of a photodetector array that corresponds to a codewheel track, for example, the track depicted in FIG. 2.

FIG. 3 depicts an embodiment of a photodetector array 140 that corresponds to a codewheel track 124, for example, the track depicted in FIG. 2. The photodetector array includes a series of photodetectors 144 that are radially aligned with the track (the track is indicated by the dashed lines 124). Each of the photodetectors has the same surface area and the same radial dimension (also referred to herein as the height dimension). Note that the side edges of the photodetectors are essentially along lines that radiate from the center of the codewheel.

The photodetectors 144 depicted in FIG. 3 are labeled in a repeating pattern of A, B, A/, B/ where "A/" is read as "A bar" and "B/" is read as "B bar." This designation of the photodetectors and the corresponding electrical signals that are generated by the photodetectors is well-known in the field. The circumferential dimensions (also referred to as the width dimensions) of the photodetectors are related to the width dimensions of the transparent and opaque sections of the track. The width dimensions are a function of the desired resolution of the photodetector array. In the embodiment of FIG. 3, each photodetector has a width that is 1.5 times the width of a transparent section of the track. Similarly, since in this example the transparent sections and opaque sections are of the same width, each photodetector has a width that is 1.5 times the width of an opaque section, as well.

Figure 4:
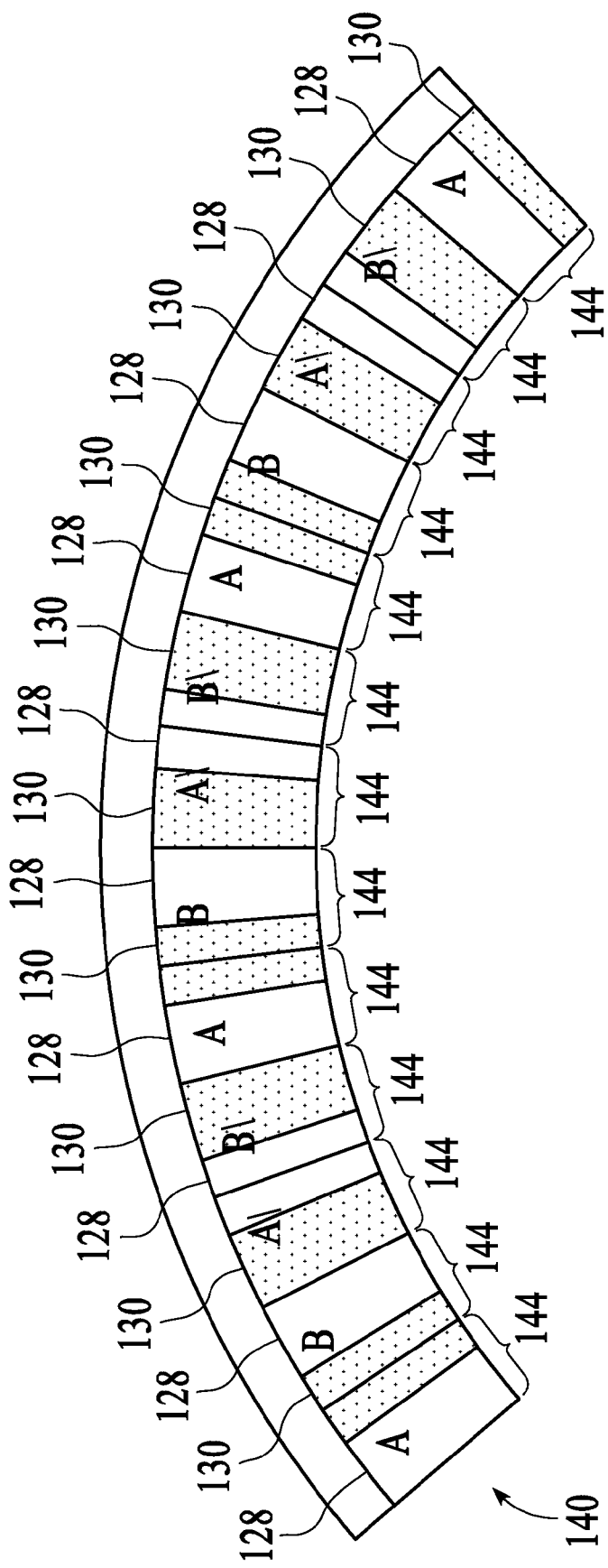
FIG. 4 depicts the photodetector array of FIG. 3 relative to the track of the codewheel of FIG. 2.

FIG. 4 depicts the photodetector array 140 (FIG. 3) relative to the track 124 of a corresponding codewheel 114 (FIG. 2). With reference to the track, the codewheel includes a pattern of transparent and opaque sections 128 and 130, respectively. In an embodiment, the width dimension of any three opaque and transparent sections of the codewheel is the same as the combined width of two photodetectors 144. In FIG. 4, the transparent and opaque sections of the track are aligned with the photodetectors to clearly illustrate the relationship between the dimensions of the photodetectors and the features of the track.

Operation of the track 124 and corresponding photodetector array 140 involves modulating light as the codewheel rotates and detecting the light at the photodetectors 144. The physical layout of the photodetectors relative to the track causes the generated electrical signals to be phase shifted with respect to one another. The signals are combined to form push-pull signals. An example of this operation is fully described in U.S. Pat. No. 4,691,101, which is incorporated by reference herein. It should be noted that the operation is described with reference to a codewheel and photodetector array having no resolution mismatch.

Figure 5:
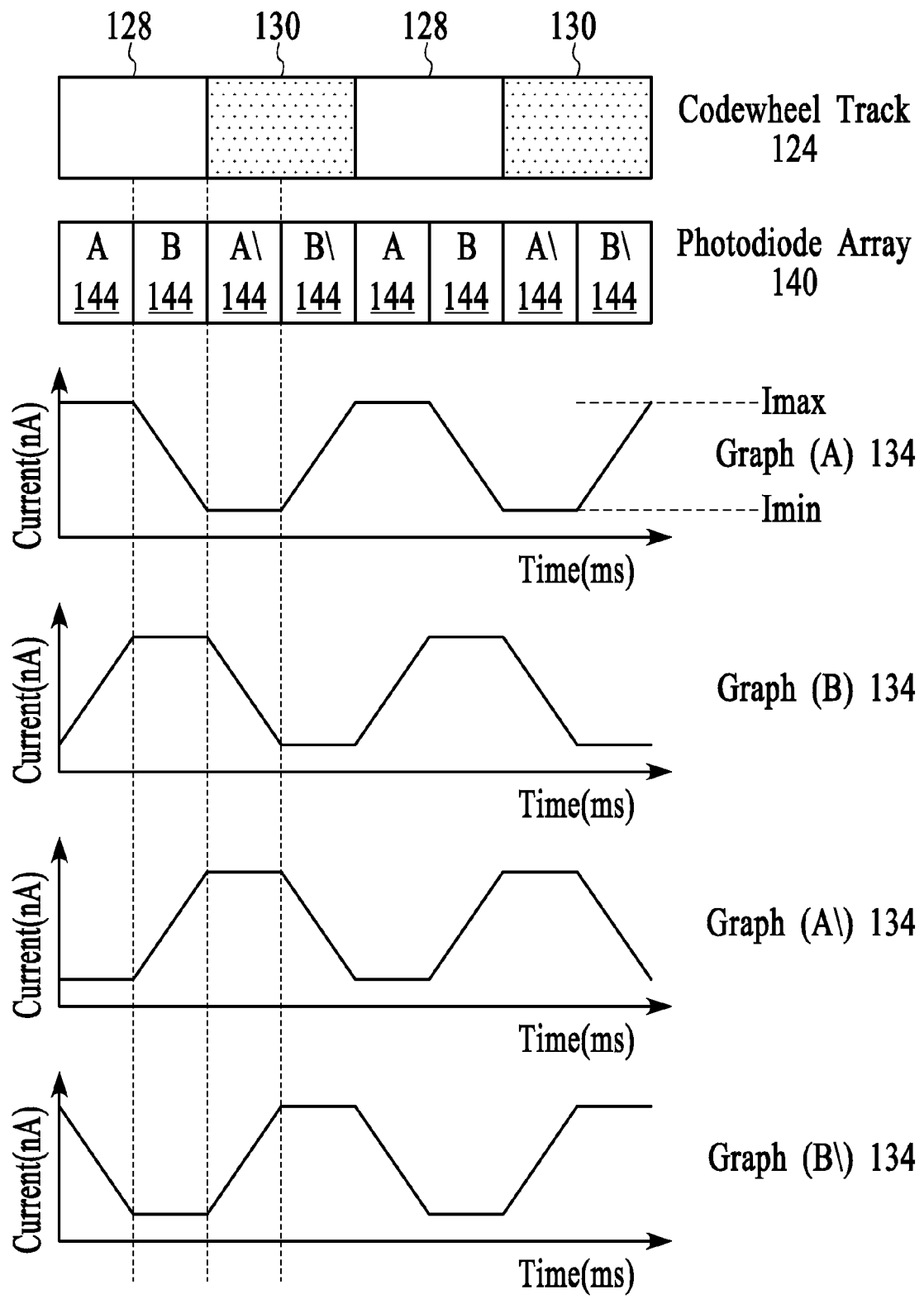
FIG. 5 depicts a stylized layout of a photodetector array and codewheel with no resolution mismatch, and current associated with the photodetectors of the photodetector array.

FIG. 5 depicts a stylized layout of a photodetector array 140 and codewheel track 124 with no resolution mismatch and graphs of the current that is associated with the photodetectors 144 of the photodetector array 140 as a function of time. As depicted in FIG. 5, the track has a linear orientation rather than the arced orientation depicted in FIGS. 2-4. The linear orientation is for illustrative purposes only (though an alternative coding element could have a linear orientation). The codewheel includes a series of alternating transparent sections 128 and opaque sections 130. The photodetector array beneath the codewheel representation includes a series of photodetectors 144. Each photodetector 144 has a designation that is representative of its position with respect to the codewheel. For example, each photodetector may have a designation of A, B, A/, or B/. Current generated by the photodetectors 144 is minimized when light from a light source (not shown) is blocked by the opaque sections 130. The minimum current is referred to as $I_{min}$ or the "dark current" since the light is blocked. The maximum current (when the light is not blocked) is referred to as $I_{max}$ or the "light current" since the light is not blocked. When light is partially blocked by the opaque sections 130, the current is somewhere between $I_{min}$ and $I_{max}$. Accordingly, each photodetector is associated with a graph 134 that illustrates current over time. Specifically, the A photodetectors are associated with graph (A), the B photodetectors are associated with the graph (B), the A\ photodetectors are associated with the graph (A\), and the B\ photodetectors are associated with the graph (B\).

In an embodiment, width dimensions of the transparent sections of the track determine the resolution of the track. Similarly, width dimensions of the photodetectors of the photodetector array determine the resolution of the photodetector array. For the resolutions of the codewheel and photodetector array to match, the width of the transparent sections should be twice the width of the photodetectors. This means that a photodetector is aligned with a transparent section (and unblocked by an opaque section) as the codewheel traverses a rotational distance equal to the width of the photodetector. The photodetector in this case generates a current equal to $I_{max}$ while the photodetector is aligned with the transparent section. Conversely, the photodetector generates a current equal to $I_{min}$ while aligned with an opaque section. The example of FIG. 5 is intended to represent a codewheel and photodetector array with no resolution mismatch.

In the example of FIG. 4, the codewheel and photodetector resolutions are mismatched. Mismatching the codewheel and photodetector resolutions can change the resolution of the optical encoder system 100 (FIG. 1). In an embodiment, the codewheel and photodetector resolutions are mismatched by a factor of 3:1. This means that the transparent sections of the codewheel are smaller than the photodetector area by ⅓. Accordingly, a minimum photodetector current is not equal to the "dark current" because the photodetector is never completely covered by an opaque section. Similarly, a maximum photodetector current is not equal to the "light current" because the photodetector is always partially covered by an opaque section. In order to achieve a higher resolution from the encoder system 100, the codewheel resolution should be higher than the photodetector array resolution.

Figure 6:
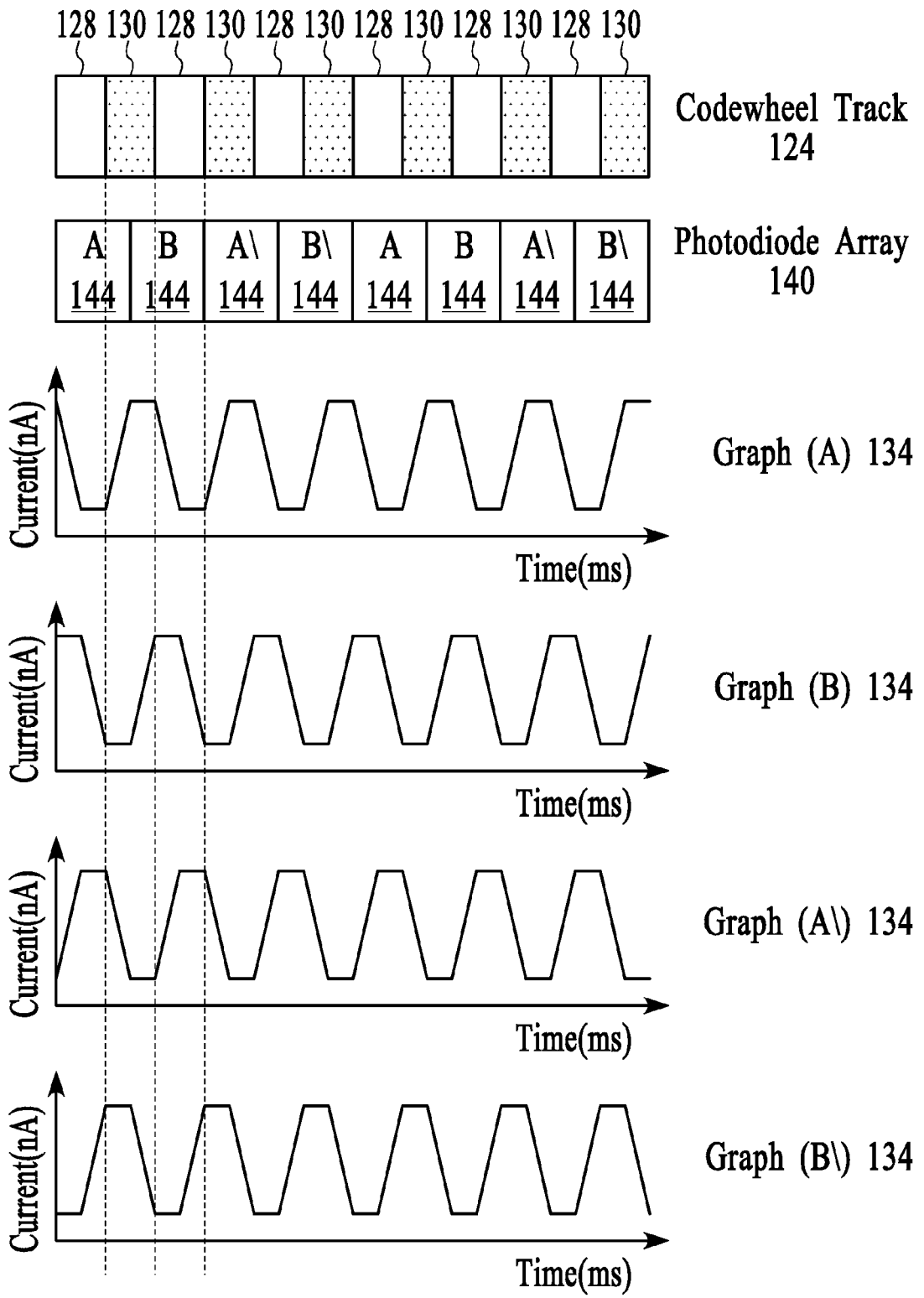
FIG. 6 depicts a stylized layout of the photodetector array of FIG. 3 and codewheel of FIG. 2, and current associated with the photodetectors of the photodetector array.

FIG. 6 depicts a stylized layout, as depicted in FIG. 4, of the photodetector array of FIG. 3 and codewheel of FIG. 2 and graphs of the current waveform that is associated with the photodetectors of the photodetector array as a function of time. As depicted in FIG. 6, the mismatch between the resolutions of the codewheel and photodetector array causes the frequency of the electrical signal from each of the photodetectors to increase by a factor of 3 compared to the frequency of the electrical signal from each of the photodetectors in an optical encoder with no mismatch, such as the one described with reference to FIG. 5. The following equations define the minimum photodetector current $I_{min}$ and the maximum photodetector current $I_{max}$ for the codewheel and photodetector configuration described with reference to FIGS. 2-4 and 6, when the codewheel and photodetector array resolution are mismatched by a factor of 3:1:

3:1 $I_{min}=I_0+I_{1/3}$

3:1 $I_{max}=I_0+I_{2/3}$, where $I_0$ is the "dark current", $I_{1/3}$ is current generated by the photodetector when ⅓ of the photodetector width is not blocked by an opaque section, and $I_{2/3}$ is current generated by the photodetector when ⅔ of the photodetector width is not blocked by an opaque section.

The signals are combined to form push-pull signals as described in U.S. Pat. No. 4,691,101, which describes signals derived from an optical encoder with no mismatch, such as the optical encoder described with reference to FIG. 5.

In accordance with the techniques discussed herein, the resolution of an optical encoder system 100 (FIG. 1) may be changed by changing the mismatch ratio between the codewheel track and the photodetector array. Increasing the mismatch ratio increases the resolution of the optical encoder. In an embodiment, the mismatch ratio is changed by changing the resolution of the codewheel track.

Figure 7:
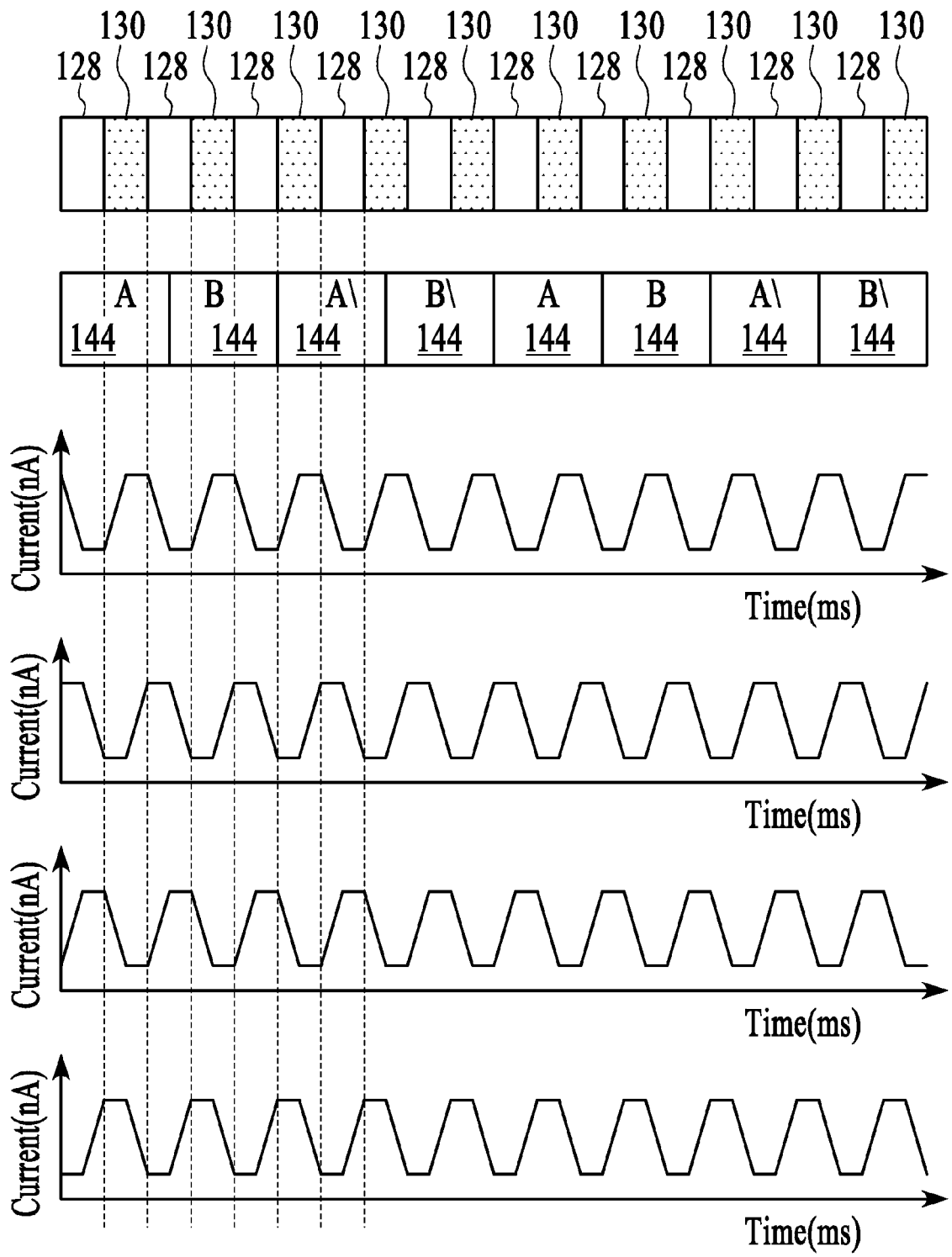
FIG. 7 depicts a stylized layout of the photodetector array of FIG. 3 and an alternative codewheel track, and current associated with the photodetectors of the photodetector array.

FIG. 7 depicts a stylized layout of the photodetector array of FIG. 3 and an alternative codewheel track and graphs of the current waveform that is associated with the photodetectors of the photodetector array. As depicted in FIG. 7, the mismatch between the resolutions of the codewheel and photodetector array causes the frequency of the electrical signal from each of the photodetectors to increase by a factor of 5 compared to the frequency of the electrical signal from each of the photodetectors in an optical encoder with no mismatch, such as the one described with reference to FIG. 5. The following equations define the minimum photodetector current $I_{min}$ and the maximum photodetector current $I_{max}$ for the codewheel and photodetector configuration described with reference to FIG. 7, when the codewheel and photodetector array resolution are mismatched by a factor of 5:1:

5:1 $I_{min}=I_0+I_{2/5}$

5:1 $I_{max}=I_0+I_{3/5}$, where $I_0$ is the "dark current", $I_{2/5}$ is current generated by the photodetector when ⅖ of the photodetector width is not blocked by an opaque section, and $I_{3/5}$ is current generated by the photodetector when ⅗ of the photodetector width is not blocked by an opaque section.

In general, a resolution factor may be defined using the following equation:

Resolution Factor $(n)=R_{codewheel}/R_{cycle}$, where $n=1, 3, 5, \ldots$, $R_{codewheel}$ is the resolution of the codewheel for a pair of sections (e.g., one opaque section and one transparent section), and $R_{cycle}$ is the resolution of one cycle of a photodetector array (e.g., A, B, A\, B\).

It should be noted that increasing the codewheel track resolution decreases the difference between $I_{max}$ and $I_{min}$. For example, consider a hypothetical photodetector that is identical to and has the same placement as a photodetector in the photodetector array. If the hypothetical photodetector is receiving light that is unblocked by an opaque section of the track, $I_{max}$ will be the same as the "light current". However, increasing codewheel track resolution means that an actual photodetector of the photodetector array may be partially blocked by an opaque section of the track. Therefore, $I_{max}$ will be less than the "light current". Similarly, whereas $I_{min}$ is equal to the "dark current" for the hypothetical photodetector, $I_{min}$ may be greater than the "dark current" when the resolution of the codewheel track is increased. Since $I_{max}$ is less than the "light current" and $I_{min}$ is greater than the "dark current", the optical encoder that includes an increased resolution codewheel has $I_{max}$ and $I_{min}$ values that are closer in value than the $I_{max}$ and $I_{min}$ values of an optical encoder that includes a lower resolution codewheel. The decreased difference between $I_{max}$ and $I_{min}$ as the resolution of the optical encoder system increases can be compensated by, for example, using a higher power LED to achieve a larger difference between $I_{max}$ and $I_{min}$.

As described above, increasing the resolution of the codewheel track can increase the resolution of the optical encoder. The resolution of the codewheel can bee increased simply by removing the codewheel and replacing it with a codewheel that has transparent and opaque sections with smaller width dimensions (i.e., higher resolution). By replacing the codewheel, the resolution is increased without requiring package redesign, increasing current consumption, or adding an interpolator (e.g., an interpolation IC). This can reduce the cost and processes typically required to provide a different encoder resolution. Providing codewheels with different resolutions improves the flexibility of the encoder and facilitates customization.

Figure 8:
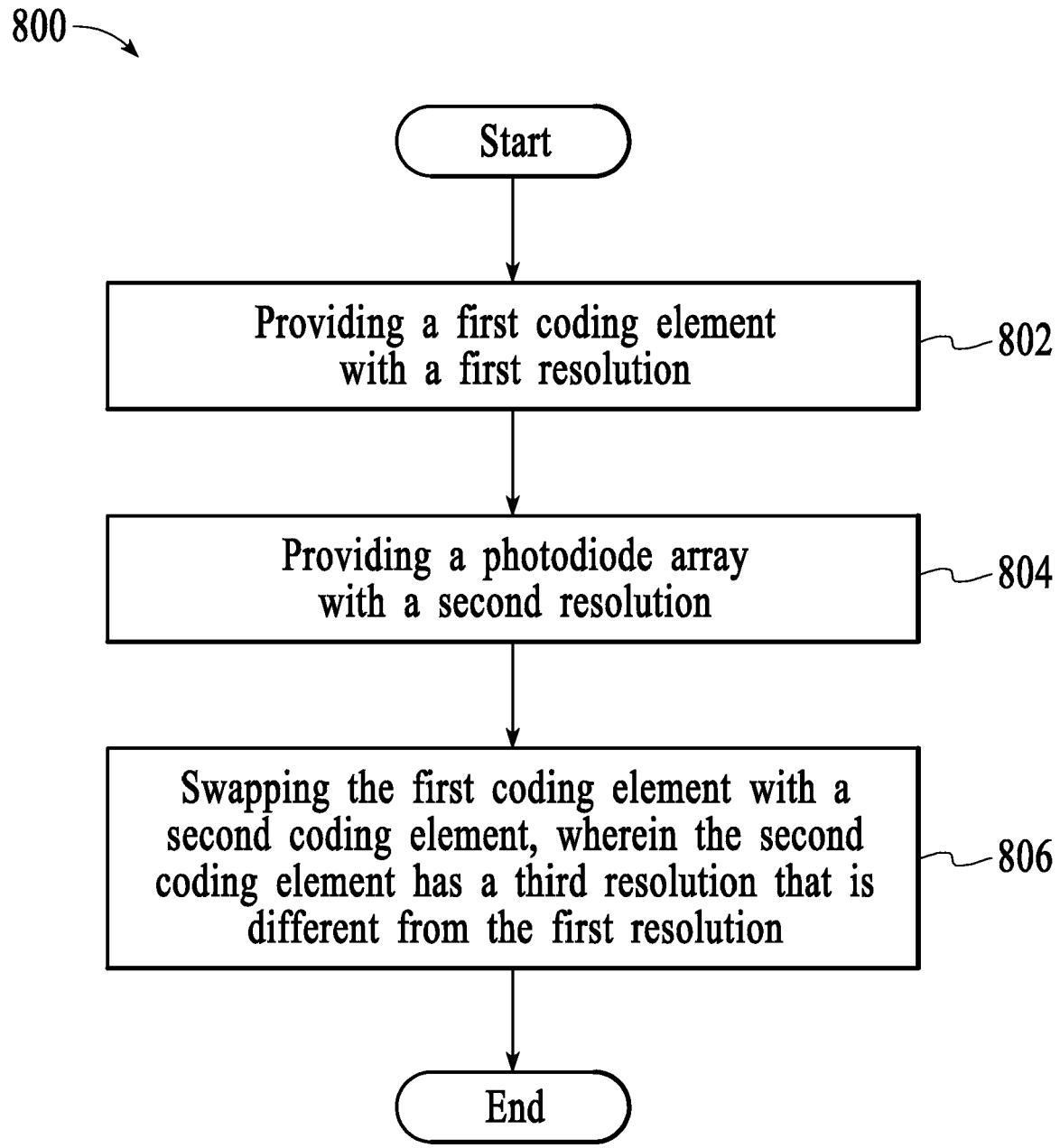
FIG. 8 depicts a flowchart of a method for configuring an optical encoder.

FIG. 8 depicts a flowchart 800 of a method for changing encoder resolution. The flowchart 800 starts with providing a first coding element with a first resolution at block 802 and providing a photodetector array with a second resolution at block 804. In an embodiment, the first coding element is the codewheel 114 (FIG. 1) and the photodetector array is the photodetector array 120 (FIG. 1). The flowchart 800 ends at block 806 with swapping the first coding element with a second coding element, wherein the second coding element has a third resolution that is different from the first resolution at block. In an embodiment, the resolution of the coding element corresponds to the resolution of a track, such as the track 124 (FIG. 2).

As used herein, the term "track" includes both the opaque and the transparent sections of the codewheel. It should be noted that the codewheel could be replaced with a coding element that is not a wheel. For example, linear coding element, such as a code strip, could be used.

In an embodiment, a photodetector includes one or more photodiodes. In an embodiment, the track 124 and respective photodetector array 140 are radially aligned such that the photodetectors are in the middle of the corresponding track. For example, as depicted in FIG. 4 the photodetector array is positioned at the center of the track. Radially aligning the photodetector array in the middle of the corresponding track balances the alignment tolerance on both sides of the photodetector array.

Although specific embodiments of the invention have been described and illustrated, the invention is not to be limited to the specific forms or arrangements of parts as described and illustrated herein. The invention is limited only by the claims.

What is claimed is:

1. An optical encoder comprising:
   a coding element having a track with an alternating pattern of transparent and opaque sections that have the same width dimension, wherein the width dimension of the transparent and opaque sections determines a resolution of the coding element;
   a light emitting diode (LED) positioned to output light to the track; and
   a photodetector array, positioned to detect light that passes through the transparent sections of the track, the photodetector array having a cycle of four photodetectors with each of the four photodetectors having the same width dimension, wherein the width dimension of the cycle of four photodetectors determines the resolution of the photodetector array; and
   wherein the resolution of the coding element and the resolution of the photodetector array are mismatched such that the width dimension of a number, n, of pairs of transparent and opaque sections of the track is equal to the width dimension of the cycle of four photodetectors, where n is an odd integer greater than 1.

2. The optical encoder of claim 1 wherein, in operation, a minimum current generated by a photodetector of the photodetector array is greater than a current generated by an identical diode with similar placement having light from the LED completely blocked by an opaque section of the track.

3. The optical encoder of claim 1 wherein said track is replaceable with another track having a different resolution.

4. The optical encoder of claim 1 wherein n=3.

5. The optical encoder of claim 1 wherein n=5.

6. A method of changing encoder resolution comprising:
providing a first coding element having a track with an alternating pattern of transparent and opaque sections that have the same width dimension, wherein the width dimension of the transparent and opaque sections determines a resolution of the first coding element;
providing a second coding element having a track with an alternating pattern of transparent and opaque sections that have the same width dimension, wherein the width dimension of the transparent and opaque sections determines a resolution of the second coding element, wherein the resolution of the first coding element is different from the resolution of the second coding element;
providing a photodetector array with a cycle of four photodetectors with each of the four photodetectors having the same width dimension, wherein the width dimension of the cycle of four photodetectors determines the resolution of the photodetector array;
wherein the resolution of the coding element and the resolution of the photodetector array are mismatched such that the width dimension of a number, n, of pairs of transparent and opaque sections of the track is equal to the width dimension of the cycle of four photodetectors, where n is an odd integer greater than 1; and
swapping the first coding element with the second coding element, wherein swapping the first coding element with the second coding element changes the number, n, of pairs of transparent and opaque sections of the track that is equal to the width dimension of the cycle of four photodetectors.

7. The method of claim 6 wherein n=3.

8. The method of claim 6 wherein n=5.

* * * * *